United States Patent [19]

Doerman

[11] 3,935,728

[45] Feb. 3, 1976

[54] TESTING OF CIGARETTES

[75] Inventor: Eryk Stefan Doerman, London, England

[73] Assignee: Molins Limited, Great Britain

[22] Filed: May 7, 1974

[21] Appl. No.: 467,777

[52] U.S. Cl. .................................................. 73/41
[51] Int. Cl.² ........................................ G01M 3/26
[58] Field of Search ............... 73/41, 45, 45.1, 45.2

[56] References Cited
UNITED STATES PATENTS

| | | | |
|---|---|---|---|
| 3,543,927 | 12/1970 | Pinkham | 73/45.1 |
| 3,575,041 | 4/1971 | Aeitman | 73/45.1 |
| 3,608,380 | 9/1971 | Muir et al. | 73/45.1 |

FOREIGN PATENTS OR APPLICATIONS

| | | | |
|---|---|---|---|
| 223,467 | 11/1968 | Sweden | 73/45.2 |

*Primary Examiner*—S. Clement Swisher
*Attorney, Agent, or Firm*—Craig & Antonelli

[57] ABSTRACT

A cigarette testing device comprises a conveyor drum which is arranged to carry cigarettes sideways through a testing station, and which includes a pair of axially spaced sets of sprocket teeth, the cigarettes being carried in the recesses between the teeth; a suction or pressure chamber which is mounted adjacent to the conveyor drum and is arranged to communicate with spaces formed between the two sets of sprocket teeth, so that at least part of each cigarette is surrounded by predetermined suction or pressure during testing; a second pair of rotating axially spaced sets of sprocket teeth which overlap with the first pair of sprocket teeth so that the cooperating sprocket teeth together form two axially spaced seals around each cigarette restricting communication between the chamber and atmosphere; and a device for sending the air flow through the wrapper of each cigarette produced by the suction or pressure in the chamber.

16 Claims, 8 Drawing Figures

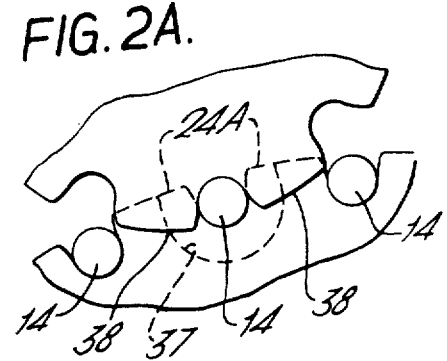
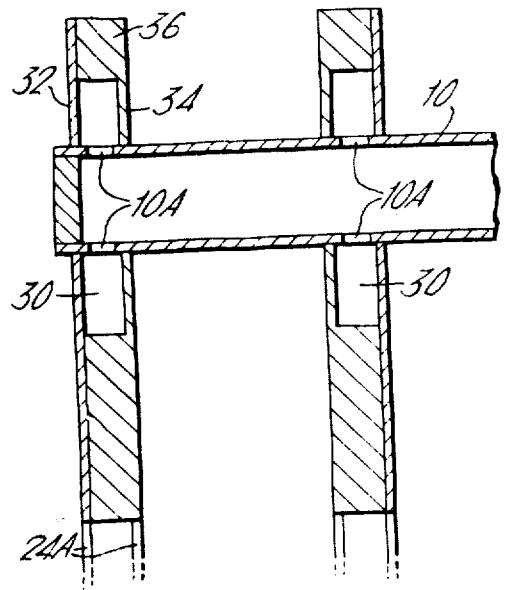
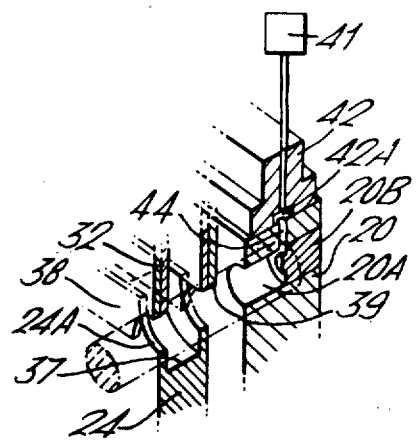

TESTING OF CIGARETTES

This invention is concerned with testing the wrappers of finished cigarettes, especially filtertipped cigarettes. In this context the term "filter" is intended to include any mouthpiece which may be attached to a cigarette, for example by means of a "cork" strip which is wrapped around the filter and overlaps on to one end of the cigarette.

According to a first aspect of this invention a cigarette testing device comprises a conveyor drum which is arranged to carry cigarettes sideways through a testing station, and which includes a pair of axially spaced sets of sprocket teeth, the cigarettes being carried in the recesses between the teeth; a suction or pressure chamber which is mounted adjacent to the conveyor drum and is arranged to communicate with spaces formed between the two sets of sprocket teeth, so that at least part of each cigarette is surrounded by predetermined suction or pressure during testing; a second pair of rotating axially spaced sets of sprocket teeth which overlap with the first pair of sprocket teeth so that the cooperating sprocket teeth together form two axially spaced seals around each cigarette restricting communication between the chamber and atmosphere; and a device for sensing the air flow through the wrapper of each cigarette produced by the suction or pressure in the chamber.

A second aspect of this invention is concerned with testing filter-tipped cigarettes which are made by joining pairs of tobacco-filled portions to opposite ends of double-filter portions, thus forming a row of double-length cigarettes which are then cut through the middle to form two rows of individual cigarettes which are fed on to a conveyor which is in two parts carrying respectively the two rows, the two parts of the conveyor having different speeds whereby the cigarettes of the two rows are staggered relatively to one another. The staggered rows are then received by a testing conveyor and are fed past a common sensing device which responds alternately to leakage flows through the cigarettes of the two rows. The sensing device may, for example, be a transducer which responds to a positive or negative pressure signal generated during testing. Testing is preferably carried out while the cigarettes are on a testing drum having a central flange with blind axial bores into which the filter ends of the cigarettes are pushed from opposite sides of the flange.

According to a third aspect of this invention, a cigarette testing device includes a test drum which carries cigarettes successively through a testing station at which one end of each cigarette (preferably the filter end in the case of filter-tipped cigarettes) projects into a close-fitting bore in a flange to which a sensing device is connected, suction or pressure being supplied to a chamber around the cigarette which is formed partly by fixed walls and partly by substantially involute-shaped sprocket teeth formed on the drum and on a member rotating about an axis parallel to the drum, the teeth being arranged to form seals around the cigarette to restrict communication between the atmosphere and the chamber around the cigarette.

Preferably the chamber around the cigarette extends along only a short portion of the cigarette in the region of the joint between the filter and the tobacco-filled portion of the cigarette, so as to provide the maximum efficiency at detecting any leaks in the joint. Alternatively, however, the chamber may extend along a greater portion of the length of the cigarette, and possibly along substantially the whole length of the cigarette.

The bore into which the end of the cigarette is pushed preferably has a predetermined clearance around the cigarette in order to provide a predetermined leakage path to atmosphere from a space at the end of the cigarette to which the transducer or other sensing device is connected; thus damage to the end of the cigarette is avoided, while any slight variations in the diameter of the cigarette end, resulting in variations in the leakage flow, can be tolerated since that variable leakage flow is swamped by the larger predetermined flow provided by the clearance around the cigarette end.

During testing, the end of the cigarette remote from the flange is preferably closed, for example by means of a member (possibly a flexible finger according to the fourth aspect of this invention) which pushes the cigarette into the bore in the flange. The cigarette may be blown out of the bore after testing by means of compressed air admitted to the space in the bore at the end of the cigarette.

According to a fourth aspect of this invention, a cigarette testing device includes a conveyor for carrying the cigarettes during testing having a part formed with bores into which at least end portions of the cigarettes are pushed for the purpose of the test operation, the cigarettes being pushed into the bores by flexible fingers extending substantially radially from a flexible disc. A roller or other device acts on the disc to deflect the fingers when necessary. Preferably the disc is positioned so that the ends of the fingers press resiliently on the cigarettes during testing, and the disc is deflected by the roller or other device to move the fingers away from the cigarettes when the cigarettes are being placed on the conveyor or removed from the conveyor.

An example of a cigarette inspection device embodying all the aspects of this invention is shown in the accompanying drawings. In these drawings:-

FIG. 2A shows part of FIG. 2 in a simplified form omitting parts of the apparatus for the sake of clarity;

FIG. 4 is an enlarged section on the line IV-IV in FIG. 1;

FIG. 5 is a fragmentary perspective view sectioned through the line III—III in FIG. 2;

Figure 1:
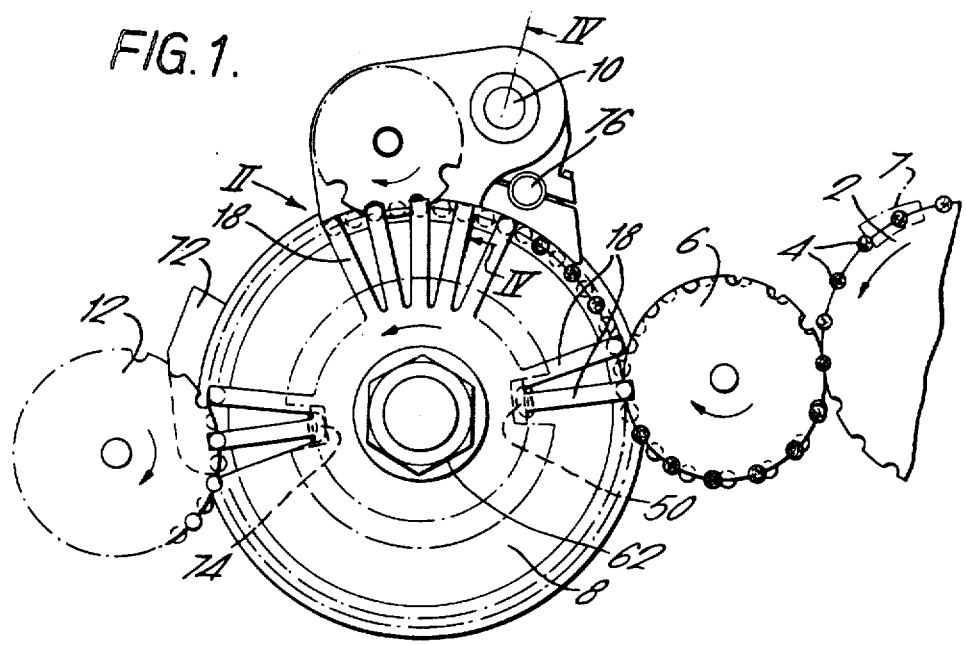
FIG. 1 is an overall side view of the inspection device.

As shown in FIG. 1, a drum 2 carries double length cigarettes 4 towards a further drum 6. The double length cigarettes are cut through the middle while on the drum 2, in a known manner, and are then spaced apart by a plough 7; the two rows of cigarettes are then transferred to the drum 6, which is in two parts carrying respectively the two rows of cigarettes. The two parts of the drum 6 move at different speeds and have flutes at slightly differing pitches so that the rows of cigarettes are staggered evenly (i.e. by a half pitch) by the time they reach a position at which they are transferred to a testing drum 8. On the testing drum 8 the cigarettes are tested by means of suction applied through a pipe 10 in a manner which will be presently described. The cigarettes are then transferred to a further drum 12. The cigarettes of one of the rows may then, for example, be turned round so that the two rows can be merged to form a combined row with the filters all at the same end.

Figure 3:
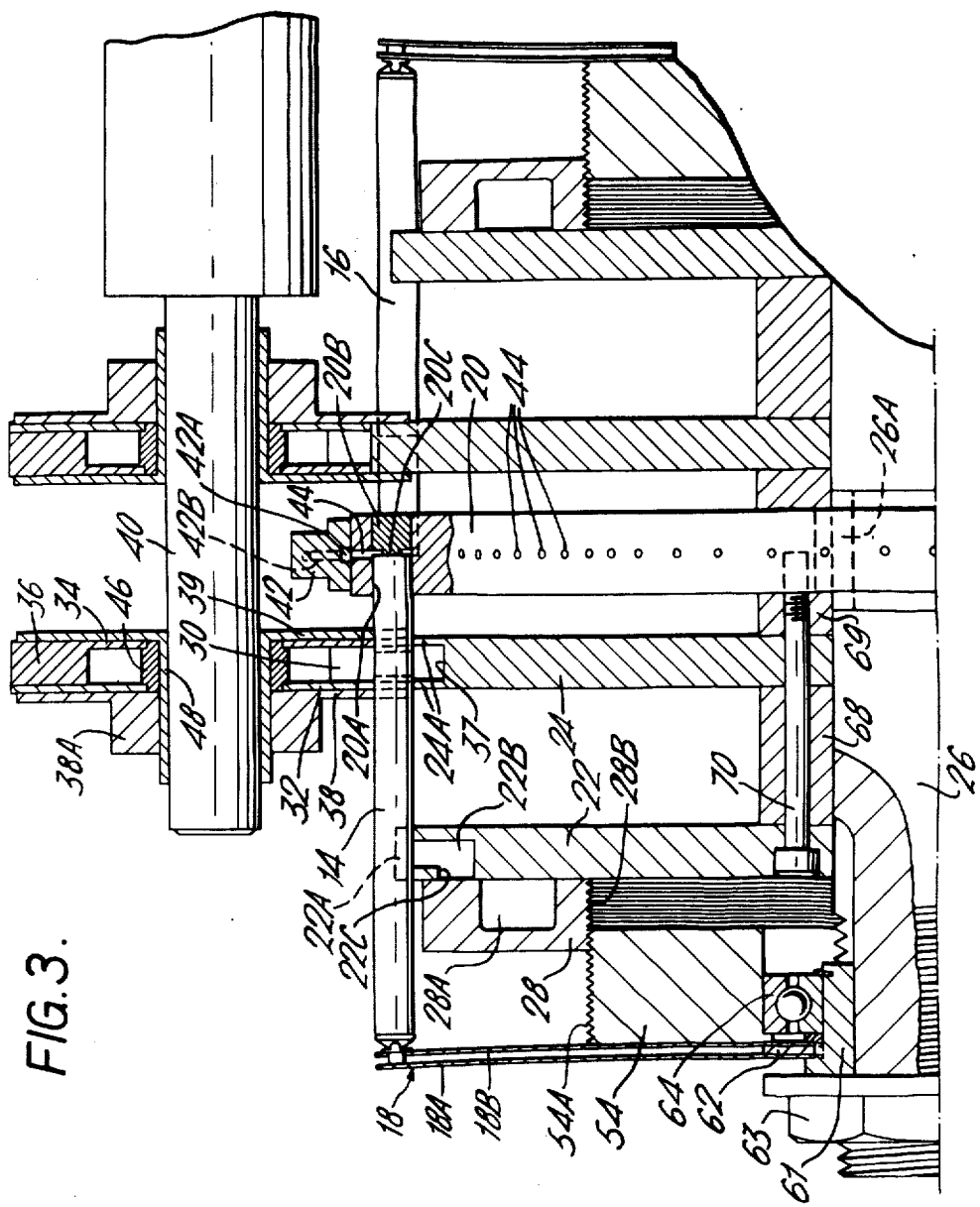
FIG. 3 is an enlarged section on the line III—III in FIG. 1.

FIG. 3 shows a cigarette 14 of one of the rows at the testing station. It also shows a cigarette 16 of the other row which is half a pitch removed from the testing station. The test carried out on each of the two rows of cigarettes while on the testing drum is identical, the two halves of the testing drum being mirror images of one another. Therefore the testing operation will only be described in relation to one of the rows of cigarettes (i.e. the cigarettes 14).

Figure 7:
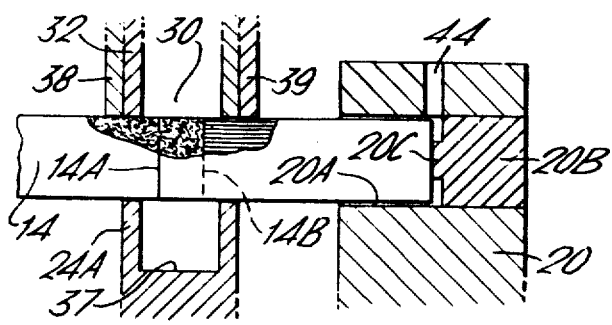
FIG. 7 is an enlargement of part of FIG. 1, showing the region of the cigarette filter.

Soon after arriving on the testing drum 8, each cigarette is displaced axially by a flexible finger 18 so that its filter end enters a precisely defined blind cylindrical bore 20A in a central flange 20, the bore extending axially halfway through the flange. It will be appreciated that the bores in the flange for receiving the cigarettes of the two rows are staggered so as not to interfere with one another. Each blind bore is formed by boring a hole right through the flange, and closing one end by means of a plug 20B which is force fit in the bore. The plug has a central projection 20C to abut the end of the filter of the cigarette. This is shown most clearly in FIG. 7.

Before being pushed into the bore 20A, the cigarette is held in alignment with the bore since it is received in a semi-cylindrical flute 22A formed in the periphery of a flange 22, and is also located at the bottom of a recess between two involute-shaped sprocket teeth 24A on a flange 24. The three flanges 20, 22 and 24 all rotate together on a shaft 26.

Figure 2:
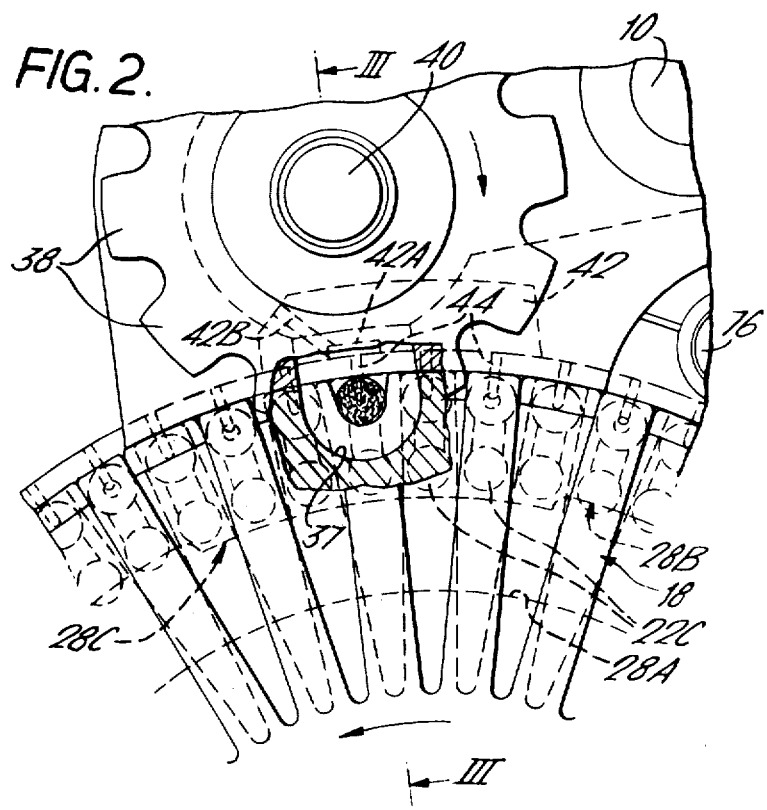
FIG. 2 is an enlarged view of part of the device shown by the arrow II.

Before and after testing, the cigarette is held on the testing drum by suction applied through a passage 22B in the flange 22 from a manifold 28A in a fixed member 28 via a mouth 22C. The member 28 may, for example, be of carbon-filled resin. Suction Ceases to be applied to the cigarette while it is in the region of the testing station; this is achieved by the stepped narrowing of the manifold 28A (FIG. 2), from the position 28B to the position 28C, so that the manifold 28A does not communicate with mouth 22C of each passage 22B. It will be seen that before the position 28B and after the position 28C, the manifold 28A communicates with the passage mouths 22C.

The testing operation is achieved by supplying suction to a chamber 30 extending around the cigarette in the region of the joint between the filter and the tobacco-filled part of the cigarette. This chamber 30 is defined partly by fixed parallel walls 32 and 34, partly by a peripheral wall 36, and partly by the sprocket teeth 24A on the flange 24. Furthermore at the actual testing station, seals are formed around the cigarettes by cooperation between the sprocket teeth 24A and similar involute-shaped sprocket teeth on sprockets 38 and 39 which are driven by a shaft 40 having its axis parallel to the axis of the testing drum. FIG. 5 and FIG. 2A show how the sprocket teeth overlap to define the desired seals around the cigarette. The shapes of the teeth on the sprockets 38 are shown most clearly in FIG. 2A. It should be understood that the rounded bottom portions of the cooperating sprocket teeth form approximately complete circles around the cigarette with slight clearance to ensure that the cigarette is not damaged.

It should be noted (see particularly FIG. 7) that the suction chamber 30 extends not only around the edge 14A of the "cork", but also around the edge 14B (inside the "cork") of the wrapper of the tobacco filled part of the cigarette. Preferably the suction chamber extends axially beyond the edges 14A and 14B by about 1 to 1.5mm.

The presence of a leak in the joint between the filter and the cigarette is detected by a transducer 41 (shown diagrammatically in FIG. 5) connected to a pad 42 having a circumferentially extending groove 42A to which the transducer is connected via a passageway 42B. A radial passageway 44 extends from the bottom end of each bore 20A (for each row of cigarettes) and communicates with the groove 42A in the pad through an arc of rotation of the testing drum extending from just upstream of the testing station (at which a pressure signal is obtained by the transducer) to just downstream of the testing station. The groove 42A is just short enough (measured circumferentially) not to communicate with two passageways 44 at a time.

FIG. 4 shows how the pipe 10 transmits suction to extensions of the spaces 30 formed between the walls 32 and 34. The pipe has slots 10A through which the interior of the pipe communicates with the spaces 30. In the region of the shaft 40 (see FIG. 3) a fixed annular member 46 is secured to the walls 32 and 34, and a sleeve 48 which is integral with or secured to the sprocket 39 runs within the annular member 46, being secured to the shaft 40. A boss 38A on the sprocket 38 is secured to the sleeve 48 so that the shaft 40 drives the two sprockets 38 and 39.

Figure 6:
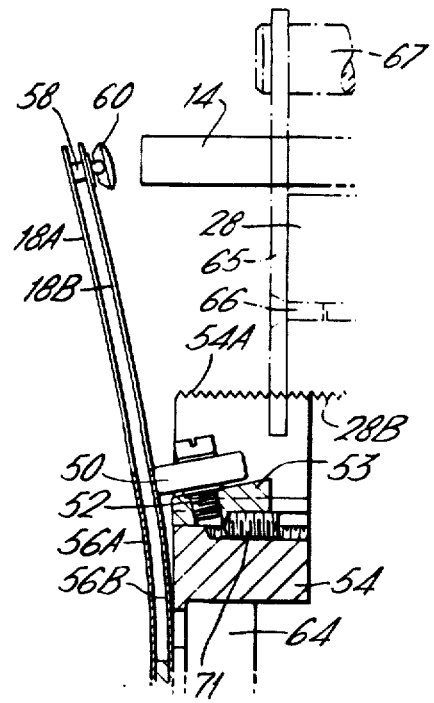
FIG. 6 is a fragmentary view showing one of the fingers and a roller controlling its movement.

The cigarettes are placed on the testing drum 8 with their tobacco ends at the position shown in FIG. 6. At this stage each finger 18 is held away from the cigarette by a roller 50 which is free to rotate about the axis of a screw 52 by which the roller is secured to an axially adjustable slider 53 on a fixed annular member 54. Each finger comprises two finger portions 18A and 18B which extend radially from two discs 56A and 56B, the fingers being integral with the discs; the roller 50 bears on the adjacent disc 56B near its periphery, the outer ends of the finger portions 18A and 18B being separated by a stud 58. A convex-faced end piece 60 is pivotally connected to each stud 58 so that the convex face of the end piece 60 can bear evenly on the adjacent end of the cigarette.

It is important to note that the roller 50 bears on the disc, instead of on the fingers. Thus the whole disc is deflected in the region of the roller, carrying with it the fingers in the region of the roller.

After moving past the roller 50, each finger is allowed to move towards the cigarette and to push the corresponding cigarette so that the filter end enters the corresponding bore 20A in the central flange 20. During testing, the finger remains slightly bowed (see FIG. 3) so as to press lightly on the cigarette; thus the end piece 60 substantially closes the tobacco end of the cigarette. This closing of the tobacco end is desirable but not absolutely essential.

The discs 56A and 56B are held on the shaft 26 by a sleeve 61 which has an internal spline engaging the shaft (and allowing axial movement relative to the shaft) and an external spline engaging the discs. A spacer ring 62 between the discs holds the discs apart. The sleeve is held on the shaft by a nut 63. A ball bearing 64 is located between the sleeve 61 and the surrounding fixed member 54.

As shown particularly in FIG. 6, the member 28 has an internal thread 28B by which it is screwed over the threaded periphery 54A of the member 54. The members 28 and 54 are held against rotation by a radial stay 65 which is secured to the member 28 by a screw 66 and projects into an axial groove in the member 54. Near its outer end the stay 65 has a bore engaging slidably on a fixed rod 67 parallel to the shaft 26.

The stay and rod 67 are shown in broken outline in FIG. 6 since they are in fact located below the testing drum 8; i.e. in the region where there are no cigarettes.

The member 22 for supporting the cigarettes is adjustable as to its axial position so that it can always be set at about the middle of the cigarettes. For this purpose, when the cigarette length is changed, an annular spacer 68 between the member 22 and the member 24 is replaced by a spacer of a suitably different length. The members 22, 24 and 68 are releasably secured to the flange 20, together with a further spacer 69, by a number of bolts 70. The flange 20 is held against rotation relative to the shaft by a key 26A.

When the member 22 is moved axially to deal with a different cigarette length, the position of the member 28 is correspondingly adjusted in the following manner. The screw 66 holding the stay is removed. Then the stay 65 is slid axially off the rod 67, and the member 54 is rotated relative to the member 28 by a half revolution, or by a multiple thereof, so that the member 28 moves axially in the required direction, the nut 63 having been previously loosened if necessary. Finally the stay 65 is replaced and secured by the screw 66.

It will be understood that the roller 50 is mounted in a recess in the member 54. It is adjustable in the following manner. The member 53 on which the roller is mounted engages in, and is movable axially along, a T-sectioned recess in the member 54. The limit of movement of the member 53 to the right is determined by a screw 71 of which the lower half is in threaded engagement with the member 54 while the screw is constrained against upward movement by engagement with a smooth semi-cylindrical recess in the member 53. The inner end of the screw abuts the end of the recess. Thus the position of the roller can be adjusted to vary the amount by which the fingers are deflected.

After testing, each cigarette is blown out of the bore 20A by compressed air supplied through the radial passageway 44 from a compressed air manifold 72. The further transfer drum 12 is formed in two axially spaced parts so that the compressed air manifold 72 can extend between the two parts all the way up to the transfer point. As each cigarette approaches the transfer point, its cooperating finger is deflected away from the cigarette by a second roller 74 which is arranged and acts similarly to the roller 50. The roller 74 is diagonally opposite to the roller 50.

A predetermined leakage to atmosphere from the passage 44 is provided by clearance between the cigarette and the surrounding wall of the bore 20A; for example, the diameter of the bore 20A may exceed that of the adjacent end of the cigarette by 4 to 6 thousandths of an inch or even slightly more. The clearance furthermore facilitates the entry of the cigarette into the bore. When larger or smaller diameter cigarettes are required to be tested, the flange 20 can be replaced by a flange with bores of different diameter. For this purpose, the nut 63 is removed completely from the shaft 26, thus allowing all the parts to the left of the flange 20 to be removed, after which the flange itself can be removed.

The assembly including the pipe 10 and the shaft 40 is secured to a member 76.

Various modifications of the illustrated arrangement are possible. Instead of the suction chamber being formed only in the region of the joint between the tobacco portion and the filter portion of each cigarette, it may extend further (and possibly all the way) along the tobacco portion of the cigarette. Furthermore, instead of suction being applied to the space 30, compressed air may be used; this applies regardless of the axial extent of the space 30.

Instead of each finger 18 comprising two portions 18A and 18B extending radially from separate discs, a single disc with radial fingers may be used.

I claim:

1. A cigarette testing device comprising a conveyor drum which is arranged to carry cigarettes sideways through a testing station, and which includes a portion formed with circumferentially spaced flutes, each terminated at opposite ends by sprocket-like teeth, the cigarettes being carried in the recesses between the teeth, said recesses having semi-circular bottom portions for closely fitting half-way around a cigarette circumference and having a depth at least equal to a cigarette diameter whereby each cigarette during testing lies entirely within the cooperating recesses; stationery means mounted closely adjacent to the said portion of the conveyor drum and defining with the flutes a suction or pressure chamber, so that at least part of each cigarette is surrounded by pre-determined suction or pressure during testing; a rotary member adjacent to the drum and formed with axially spaced sets of sprocket teeth which are axially slightly off-set from and over lap with the sprocket-like teeth on the drum so that the cooperating teeth together form two axially spaced seals around each cigarette restricting communication between the chamber and atmosphere; and a device for sensing the air-flow through the wrapper of each cigarette produced by the suction or pressure in the chamber.

2. A cigarette testing device according to claim 1 for testing filter-tipped cigarettes, in which the suction or pressure chamber provides suction or pressure, during testing, only in the region of the joint between the filter and the tobacco-filled part of the cigarette.

3. A cigarette testing device according to claim 1 for testing filter-tipped cigarettes, in which the drum includes a flange having axial bores into which the filter ends of the cigarettes are pressed prior to testing, and in which the sensing device is arranged to detect the pressure at the bottom of the axial bore adjacent to the end face of the filter.

4. A cigarette testing device according to claim 3 in which there is a predetermined leakage path to atmosphere between the wall of each bore and the portion of the cigarette contained in it during testing.

5. A cigarette testing device according to claim 3 in which the tobacco end of the cigarette is substantially closed during testing.

6. A cigarette testing device according to claim 5 in which the tobacco end is closed by a part of a member which is arranged to press the filter end of the cigarette into the corresponding bore prior to testing.

7. A cigarette testing device, for testing filter-tipped cigarettes, comprising a conveyor drum which is arranged to carry cigarettes sideways through a testing station, and which includes a pair of axially spaced sets of sprocket teeth, the cigarettes being carried in the recesses between the teeth; a suction or pressure chamber which is mounted adjacent to the conveyor drum and is arranged to communicate with spaces formed between the two sets of sprocket teeth, so that at least part of each cigarette is surrounded by predetermined suction or pressure during testing; a second pair of rotating axially spaced sets of sprocket teeth which overlap with the first pair of sprocket teeth so that the cooperating sprocket teeth together form two axially spaced seals around each cigarette restricting communication between the chamber and atmosphere; and a device for sensing the air flow through the wrapper of each cigarette produced by the suction or pressure in the chamber; the drum including a flange having axial bores into which the filter ends of the cigarettes are pressed prior to testing, and the sensing device being arranged to detect the pressure at the bottom of the axial bore adjacent to the end face of the filter, the tobacco end of the cigarette being substantially closed, during testing, by one of a set of resilient substantially radial fingers on a member which is arranged to press the filter end of the cigarette into the corresponding bore prior to testing.

8. A cigarette testing device according to claim 7 in which the fingers are connected to and extend radially from a central disc co-axial with the drum, and in which the fingers are controlled as to their movement by at least one roller or other member which bears against the disc near its periphery.

9. A cigarette testing device according to claim 3 in which the flange is at the middle of the drum, and in which the drum is arranged to receive two rows of filter-tipped cigarettes and has two sets of axial bores extending into it respectively from opposite sides to receive the filter ends of the two rows of cigarettes.

10. A cigarette testing device according to claim 9 in which a common sensing device is connected alternately to opposite axial bores via passages in the flange.

11. A cigarette testing device, for testing filter-tipped cigarettes, comprising a conveyor drum which is arranged to carry cigarettes sideways through a testing station, and which includes a pair of axially spaced sets of sprocket teeth, the cigarettes being carried in the recesses between the teeth; a suction or pressure chamber which is mounted adjacent to the conveyor drum and is arranged to communicate with spaces formed between the two sets of sprocket teeth, so that at least part of each cigarette is surrounded by predetermined suction or pressure during testing; a second pair of rotating axially spaced sets of sprocket teeth which overlap with the first pair of sprocket teeth so that the cooperating sprocket teeth together form two axially spaced seals around each cigarette restricting communication between the chamber and atmosphere; and a device for sensing the air flow through the wrapper of each cigarette produced by the suction or pressure in the chamber; the drum including a flange having axial bores into which the filter ends of the cigarettes are pressed prior to testing, and the sensing device being arranged to detect the pressure at the bottom of the axial bore adjacent to the end face of the filter, the flange being at the middle of the drum and the drum being arranged to receive two rows of filter-tipped cigarettes and having two sets of axial bores extending into it respectively from opposite sides to receive the filter ends of the two rows of cigarettes, the two sets of axial bores being staggered relative to one another and the two rows of cigarettes being fed onto the drum by a transfer drum which comprises two parts which respectively receive the two rows of cigarettes, initially unstaggered, and rotate at slightly different speeds so as to stagger the two rows before delivering them onto the main drum of the testing device.

12. A cigarette testing device for testing filter-tipped cigarettes which are made by joining pairs of tobacco-filled portions to opposite ends of double-filter portions, thus forming a row of double length cigarettes which are then cut through the middle to form two rows of individual cigarettes, characterised in that the two rows are conveyed on to a testing conveyor by a transfer conveyor which comprises two parts which respectively receive the two rows of cigarettes and move at slightly different speeds so as to stagger the two rows before delivering them onto the testing conveyor, which feeds the two staggered rows past a common sensing device which responds alternately to leakage flows through the cigarettes of the two rows.

13. A cigarette testing device including a test drum which carries cigarettes successively through a testing station at which one end of each cigarette projects into a close-fitting bore in a flange to which a sensing device is connected, suction or pressure being supplied to a chamber around the cigarette which is formed partly by fixed walls and partly by substantially involute-shaped sprocket teeth formed on the drum and on a member rotating about an axis parallel to the drum, the teeth being arranged to overlap to form seals around the cigarette to restrict communication between the atmosphere and the chamber around the cigarette.

14. A cigarette testing device including a conveyor for carrying the cigarettes during testing having a part formed with bores into which at least end portions of the cigarettes are pushed for the purpose of the test operation, the cigarettes being pushed into the bores by flexible fingers extending substantially radially from a flexible disc.

15. A cigarette testing device according to claim 14 in which a roller or other device acts on the disc to deflect the fingers when necessary.

16. A cigarette testing device according to claim 15 in which the disc is positioned so that the ends of the fingers press resiliently on the cigarettes during testing, and the disc is deflected by the roller or other device to move the fingers away from the cigarettes when the cigarettes are being placed on the conveyor or removed from the conveyor.

* * * * *

UNITED STATES PATENT OFFICE
CERTIFICATE OF CORRECTION

Patent No. 3,935,728    Dated   February 3, 1976

Inventor(s)  Eryk Stefan Doerman

It is certified that error appears in the above-identified patent and that said Letters Patent are hereby corrected as shown below:

Priority Data Omitted. Should read:

-- Great Britian          22003/73, filed May 8, 1973. --

Signed and Sealed this eighth Day of June 1976

[SEAL]

Attest:

RUTH C. MASON
Attesting Officer

C. MARSHALL DANN
Commissioner of Patents and Trademarks